United States Patent [19]
Field et al.

[11] Patent Number: 5,383,282
[45] Date of Patent: Jan. 24, 1995

[54] SADDLE-JOINT JIG

[75] Inventors: Robert W. Field, 81 Nelson Road, Gorleston, Great Yarmouth NR31 6AY, Norfolk; Derek V. Doerr, Great Yarmouth, both of United Kingdom

[73] Assignees: Robert W. Field; Gordon J. Kingston, both of Norfolk, Great Britain

[21] Appl. No.: 78,329

[22] PCT Filed: Nov. 27, 1991

[86] PCT No.: PCT/GB91/02094
  § 371 Date: May 26, 1993
  § 102(e) Date: May 26, 1993

[87] PCT Pub. No.: WO92/09841
  PCT Pub. Date: Jun. 11, 1992

[30] Foreign Application Priority Data

Nov. 28, 1990 [GB] United Kingdom ............... 9025903

[51] Int. Cl.6 ............................................. G01B 5/20
[52] U.S. Cl. ....................................... 33/529; 33/561.1
[58] Field of Search ................... 33/529, 561.1, 561.2, 33/561.3, 562, 21.3

[56] References Cited

U.S. PATENT DOCUMENTS

| | | | |
|---|---|---|---|
| 776,713 | 12/1904 | Wurts | 33/529 |
| 2,380,919 | 8/1945 | Bugenhagen | 33/529 |
| 2,615,255 | 10/1952 | Rankin | 33/561.1 |
| 2,671,273 | 3/1954 | Barnes | 33/529 |
| 2,742,706 | 4/1956 | Rushing, Jr. | 33/529 |
| 2,759,271 | 8/1956 | Von Duyke | 33/561.1 |
| 4,419,828 | 12/1983 | Farris | 33/561.1 |
| 4,700,487 | 10/1987 | Bögle | 33/561.1 |
| 4,807,369 | 2/1989 | Ming-Chin | 33/529 |
| 4,956,924 | 9/1990 | Hu | 33/561.1 |

Primary Examiner—William A. Cuchlinski, Jr.
Assistant Examiner—G. Bradley Bennett
Attorney, Agent, or Firm—Galgano & Burke

[57] ABSTRACT

A saddle-joint jig for reproducing the line of contact of the first tube in relation to a second tube so that the first tube, when cut along that line, may be joined in end-to-edge abutment to the second tube, in that same relation. The jig includes at least three generally parallel pins, each of which is slideably held to allow each pin to slide longitudinally when a force is applied thereto. The pins are held in a band that, in use, is capable of circumferentially enclosing the first tube.

6 Claims, 3 Drawing Sheets

SADDLE-JOINT JIG

FIELD OF THE INVENTION

The present invention relates to saddle-joint jigs.

BACKGROUND TO THE INVENTION

In many fields there is a need to join tubes together at right angles to their longitudinal axes—such joints are known as saddle joints and, by way of example, one is shown schematically in FIG. 1. In order to join a first tube end on to the side of a second tube in this way it is necessary to cut the end of the first tube so that it matches the exterior shape of the second tube allowing it to be joined to the second tube in end-to-edge abutment. In even the simplest cylindrical case, involving circular-cylindrical tubes, where a first tube joins a second tube at a right angle it is a relatively complex operation to determine exactly the shape that the end of the first tube needs to be cut to in order to fit the second tube.

The conventional method for reproducing the necessary shape of the end of the first pipe in order for it to fit to the second pipe involves the use of relatively complex Euclidean geometry calculations to arrive at a curve which can be drawn on a piece of paper. The paper is wrapped around the tube and used as a guideline along which a cut is made.

A skilled and experienced technician is generally required to carry out these calculations and the process is a protracted one.

Furthermore, in such a lengthy and complex process there is always a significant risk that an error may be made, which can result in an expensive mistake.

Evidently there is a need for a simpler method of reproducing the shape to which a first tube must be cut when joining it in end-to-edge abutment to a second tube.

SUMMARY OF THE INVENTION

Accordingly, the present invention provides a saddle-joint jig for reproducing the line of contact of a first tube in relation to a second tube so that the first tube, when cut along that line, may be joined in end-to-edge abutment to the second tube in that same relation; which jig comprises at least three generally parallel pins each of which is slidingly held to allow each pin to slide longitudinally when a force is applied thereto; the pins being held in a band that, in use, is capable of circumferentially enclosing the first tube.

The present invention further provides a method of reproducing the line of contact of a first tube in relation to a second tube so that the first tube, when cut along that line, may be joined in end-to-edge abutment with the second tube in that same relation; the method comprising the use of a saddle-joint jig described above.

DESCRIPTION OF THE PREFERRED EMBODIMENTS

The invention will now be described, by way of example only, with reference to the drawings that follow.

Figure 2:
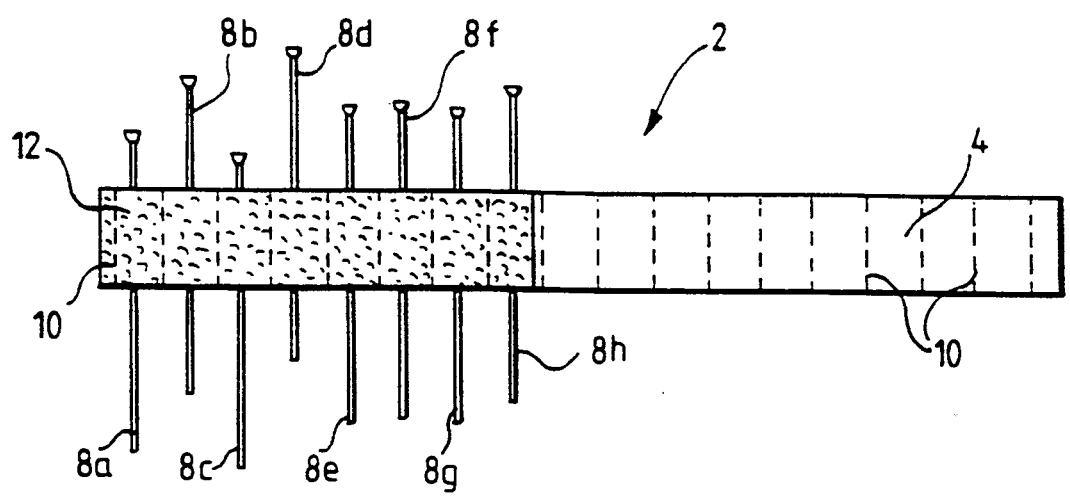
FIG. 2 is a diagrammatic plan view of a jig in accordance with the present invention, the jig has been shortened for clarity.
Figure 3:
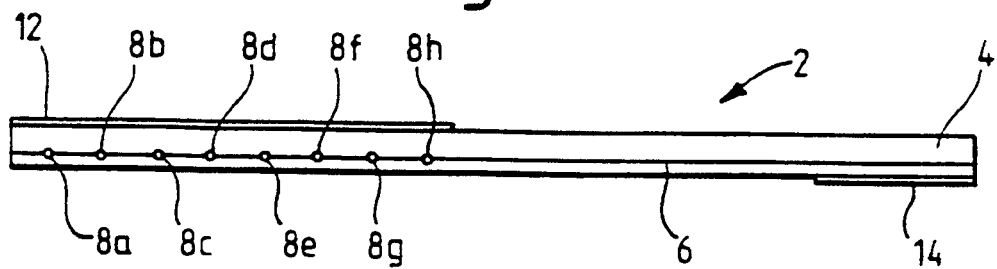
FIG. 3 is a diagrammatic front view of the jig shown in FIG. 2 with the stitching removed for clarity.

Referring now to FIGS. 2 and 3 of the drawings that follow there is shown a saddle-joint jig 2 comprising a first strip of webbing 4, a second strip of webbing 6, a plurality of substantially similar pins 8a–8h, stitching 10 (not shown in FIG. 3), a first strip of fastening material 12 and a second strip of co-operating fastening material 14.

The first and second strips of webbing 4 and 6 respectively are held together in face-to-face relation by the stitching 10 to comprise a band. The first strip of webbing 4 is approximately twice as thick as the second strip of webbing 6. The stitching 10 is machined in a plurality of evenly (optional) spaced lengths that run across, and through the webbing 4, 6. The spacing between the lengths of stitching 10 is approximately four times the diameter of the pins 8a–8h described more fully below.

The stitching 10 also secures the fastening materials 12, 14 to the strips of webbing 4, 6 respectively. The fastening materials are co-operating strips of Velcro, although other like fastening means may be used. The first strip of fastening material 12 extends from one end of the first strip of webbing 4 for approximately one half of its length, whilst the second strip of co-operating fastening material 14 extends from the opposite end of the second strip of webbing 6 for approximately one sixth of its length. Thus the jig 2 may be rolled up and held in position by the fastening materials 12, 14 around tubes having a variety of sizes.

The pins 8a–8h (see FIG. 4) are all elongate pins having splayed heads 16 at one end and tapering points 18 at the other end; the taper comprises two angled faces. The bodies of the pins 8a–8h are substantially circular in cross-section. The pins 8a–8h are inserted into the gaps between the strips of webbing 4, 6 and the spaced lengths of stitching 10.

The pins 8a–8h are held between the two strips of webbing 4, 6 by frictional contact with the facing sides of the webbing strips 4, 6; the spacing of each of the lengths of stitching 10 is determined so that the pins 8a–8h may be held in this manner whilst allowing them to slide longitudinally relative to the webbing when a suitable force is applied, i.e. they are pushed or pulled relative to the strips 4, 6. The total width of the strips of webbing 4, 6 (which together comprise a band) is sufficient to hold the pins 8a–8h substantially in position. Pins 8 may be added (or removed) to (or from) the jig 2 as required; a minimum of three pins 8 are necessary for the present invention. The higher the pin density the greater the accuracy; a pin density of one pin per centimeter length of band has been found to be appropriate.

A method, in accordance with the present invention, of forming a saddle joint (such as that shown in FIG. 1) will now be described which makes use of the apparatus described above and illustrated in FIGS. 2–4.

Figure 4:
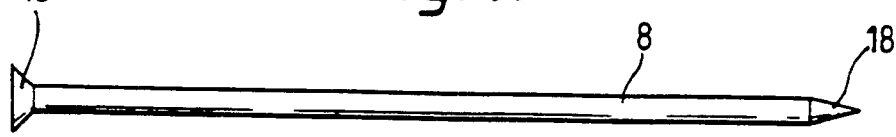
FIG. 4 is a diagrammatic enlarged side view of one of the pins shown in FIGS. 2 and 3.

Referring now to FIG. 4, there is shown a first tube 20 and a second tube 22; both tubes 20, 22 are hollow and circularly-cylindrical. It should be noted that the tubes may be curved and need not be hollow nor circularly-cylindrical, although the present invention is of special merit when used with cylindrical tubes. Moreover, the tubes need not be similar.

Figure 1:
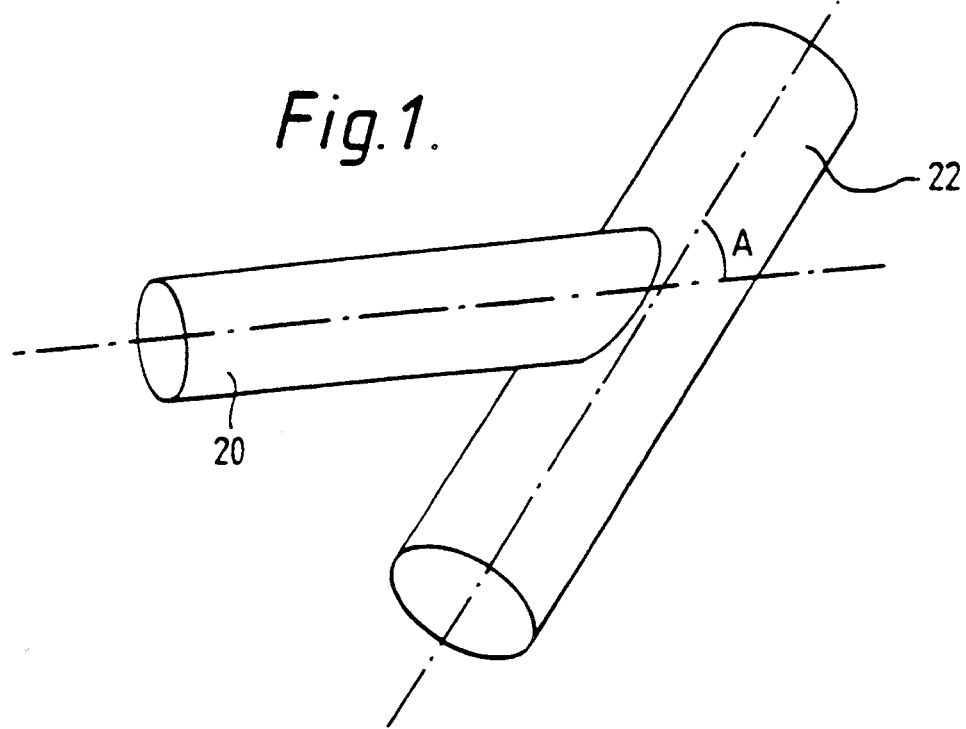
FIG. 1 is a schematic representation of a saddle-joint involving two hollow circular-cylindrical tubes.

It is intended that the first tube 20, the end of which is initially cut substantially perpendicular to its longitudinal axis, be joined to the second tube 22 at an angle in end-to-edge abutment as shown in FIG. 1. In order for this to be accomplished it is necessary for the end of tube 20 to be cut along the line of contact of the tubes 20, 22, which is the line along which they will eventually abut, as described above, to form a saddle-joint. The line of contact is reproduced in the manner more fully described below.

Figure 5:
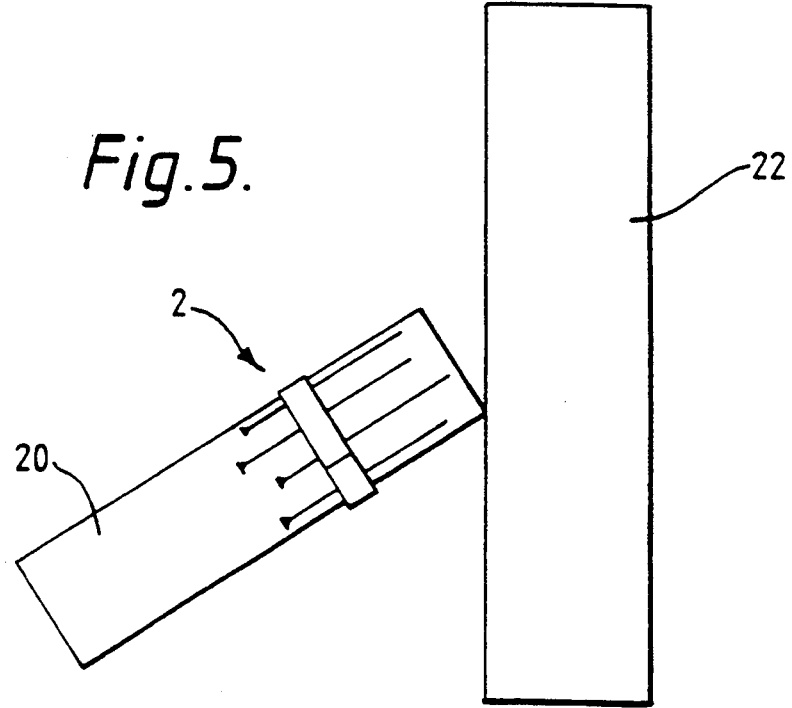
FIG. 5 is a diagrammatic plan view of the jig shown in FIGS. 2 and 3 in use.

The first tube 20 is located in relation to the second tube 22 so that the longitudinal axes of the tubes 20, 22 are coaxially continuous with the longitudinal axes of the tubes 20, 22 in their desired positions, as shown in FIG. 1. This means that the tubes 20, 22 will be in the same positions that they will occupy when joined except that the first tube 20 will be displaced from the position along its longitudinal axis. Normally the first tube 20 will be moved so that it abuts against the second tube 22 at at least one point, as shown in FIG. 5. The first and second tubes 20, 22 may be temporarily welded, or otherwise joined, where they abut at this stage in order to more securely locate the tubes 20, 22 in relation to each other during the subsequent steps involved in the present invention.

Also shown in FIG. 5 is the jig 2 which has now been tightly wound around the first tube 20. The strips of fastening material 10, 12 have been pressed together to secure the jig 2 in place. The pins 8 have been added, or removed as necessary to ensure that there are pins 8 evenly spaced around the tube 20. At this stage the pins 8a–8h may be in a variety of longitudinal positions relative to the strips 4, 6. It is to be noted that the jig 2 is wound around the tube 20 with the second (thinner) strip of webbing 6 innermost—the reason for this is explained further below.

Figure 6:
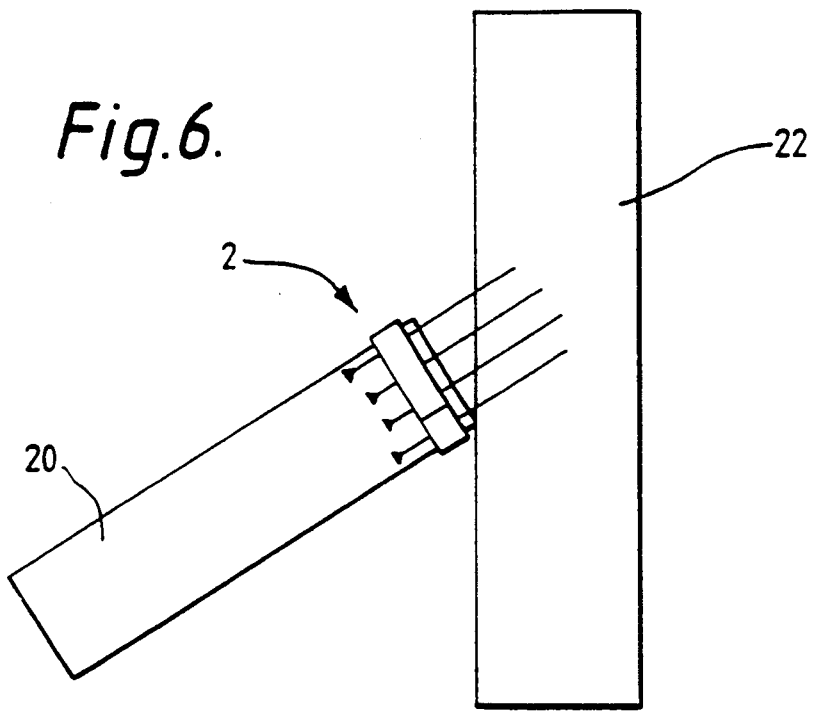
FIG. 6 is a diagrammatic plan view of the jig shown in FIGS. 2 and 3 in an intermediate stage of its use.

Referring now to FIG. 6, there is shown an intermediate stage in the use of the saddle-joint jig 2. At this stage the jig 2 has been pushed along the first tube 20 so that all of the pins 8a–8h are capable of reaching the second tube 22, alternatively the jig 2 may initially be wound-on in such a position.

The pins 8a–8h are then pushed towards the second tube 22 until the tapered points 18 reach the second tube 22; this situation is shown in FIG. 6. Once the tapered ends 18 contact the second tube 22, the pins 8a–8h may be left in that position as the friction and pressure caused by the webbing 4, 6 holds the pins 8a–8h in place. Whilst the pins 8a–8h are pushed towards the second tube 22 their tapered ends 18 may also be pushed towards the first tube 20 so that the points of contact of the tapered ends 18 with the second tube 22 are as close as possible to the eventual point of contact of the first tube 20 the second tube 22 (if the first tube 20 was extended towards the second tube 22 (if the first tube 20 was extended towards the second tube 22). The second strip of webbing 6 is sufficiently thin that the pins 8a–8h are already close enough to the first tube 20 so that the point of contact of the pins 8a–8h with the second tube 22 will often be sufficiently accurate. The splayed heads 16 act as convenient points against which force may be applied and also assist as stops to prevent the pins being pushed, or pulled, in one direction through the channels in the webbing 4, 6 formed by the stitching 10.

The pins 8a–8h may be used to reproduce the line of contact (as described above) of the first tube 20 with the second tube 22. Thus, if the tapered ends 18 of the pins 8a–8h were joined in a continuous smooth curve they would reproduce the line of contact of the first tube 18 with the second tube 20 to within the normally required degree of accuracy. If the pins 8a–8h are all known to be of the same length then the tips of the splayed ends 16 may be joined in a continuous smooth curve to reproduce the line of contact—however, care must be taken with this method since any differences in the lengths of the pins 8a–8h may result in subsequent inaccuracies as will be appreciated by those skilled in the art. In order to make use of the reproduction of the line of contact produced by the tapered ends 18 of the pins 8a–8h the jig 2 can be retracted as shown in FIG. 7.

Figure 7:
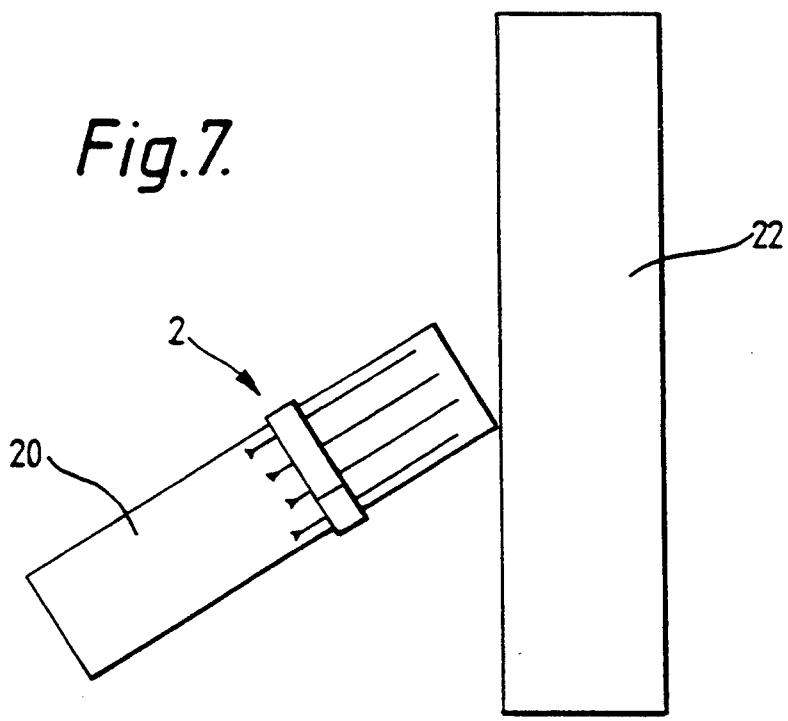
FIG. 7 is a diagrammatic plan view of the jig shown in FIGS. 2 and 3 at a later stage of its use.

In FIG. 7 the jig 2 has been moved back along the first tube 20, away from the second tube 22, until all of the tapered ends 18 of the pins 8a–8h are on, or over, the first tube 20. If the pins 8a–8h, when they were pushed to contact the second tube 22, were also pushed towards the first tube 20 then this is repeated. The line of contact of the first tube 20 with the second tube 22 can then be reproduced on the first tube 20 by marking the position of the tapered ends 18 on the first tube 20 and then joining these marks together with a continuous smooth curve; the jig 2 may then be removed.

The remaining procedure is well known to those skilled in the art and comprises cutting the end of the first tube 20 along the marked line and joining it in end-to-edge abutment to the second tube 22, for instance by welding. If the tubes 20, 22 are conduits then it may also be necessary to cut a hole in the second tube 22 which can be marked from the outline of the now known line of contact of the two tubes 20, 22; either internally or externally.

An alternative method, falling within the scope of the present invention, which provides a reproduction of the line of contact of the tubes 20, 22 that is more familiar to those skilled in the art will now be briefly described.

When the jig 2 is wound around the first tube 20 it may also be wound around a piece of paper (not shown) so that the paper lies between the jig 2 and the first tube 20. The method described above is then followed with the paper remaining between the jig 2 and the first tube 20 throughout; except that instead of marking the tube 20 to transfer the reproduction of the line of contact from the jig 2, the piece of paper is instead marked and the points on the paper joined with a continuous smooth curve. The paper may then be cut along this line and thus serve as a template for cutting.

It should be noted that the fastening materials 12, 14 can extend the whole or any convenient part of the length of the webbing 4, 6 and need not be of the same length. The webbing 4, 6 may also be of any desired and convenient length and the first strip of webbing 4 need not be the same length or width as the second strip of webbing 8; although normally it will be.

The pins 8a–8h need not include the splayed and tapered ends 16, 18 respectively. In fact a simple elongate cylinder will normally suffice, as will other shapes of pins.

A further embodiment of the present invention may comprise an elasticated continuous band which can slide along a first tube 20.

Thus the present invention provides a method and apparatus which may be used by those with little or no experience in the field of saddle-joints to produce a reproduction of the line of contact of two tubes. The method and apparatus provided by the present invention are versatile, cheap and easy to use; the necessary apparatus may also be produced from materials that can withstand an engineering environment for extended periods. A variety of jigs may be offered having differing circumferential ranges and other modifications.

We claim:

1. A saddle-joint jig for reproducing the line of contact of a first tube in relation to a second tube so that the first tube, when cut along that line, may be joined in end-to-edge abutment to the second tube in that same relation, which jig comprises:

a band for circumferentially encircling the first tube and which has a plurality of substantially parallel sleeves extending across the breadth thereof, the band being formed of a first strip of material adapted to be wrapped around said first tube in order to circumferential encircle it, superimposed upon a second strip of such material, the first strip being fixed to the second strip at intervals therealong such as to form said plurality of sleeves between the first strip and the second strip;

said band being sufficiently flexible to fit tubes of various shapes and including means to permit mounting on tubes having a variety of sizes, said means including fastening means located along the ends of said band to permit overlapping of said ends to fit said tubes in a variety of sizes;

and at least three pins, each of which is slidingly held, in use, within a respective one of said plurality of sleeves to allow each pin to slide longitudinally and extend from the respective sleeve when a force is applied thereto.

2. A saddle-joint jig as claimed in claim 1, wherein the first strip of material and the second strip of material comprise webbing and the first strip is fixed to the second strip by stitching.

3. A saddle-joint jig as claimed in claim 1, wherein the band has a first end and a second end and first co-operative engagement means are provided adjacent to the first end to co-operatively engage with a second co-operative engagement means located adjacent to the second end such that the band, when wrapped around a tube can be fastened to itself to hold it in place on the tube.

4. A method of reproducing the line of contact of a first tube in relation to a second tube so that the first tube, when cut along that line may be joined in end-to-edge abutment with the second tube in that same relation; the method comprising the steps of:

placing a saddle-joint jig on said first tube, said jig comprising a band circumferentially encircling the first tube and which has a plurality of substantially parallel sleeves extending across the breadth thereof, the band being formed of a first strip of material superimposed upon a second strip of material, the first strip being fixed to the second strip at intervals therealong such as to form said plurality of sleeves between the first strip and the second strip and being sufficiently flexible to fit a tube having any one of a variety of shapes; and at least three pins, each of which is slidingly held, in use, within a respective one of said plurality of sleeves to allow each pin to slide longitudinally and extend from the respective sleeve when a force is applied thereto;

overlapping the ends of said band surrounding said first tube so as to fit said first tube in a variety of sizes and shaped; and advancing said pins in said sleeves so that their leading ends contact said second tube.

5. A method as claimed in claim 4, wherein a line is then marked on the first tube which corresponds to a line joining the leading ends of the pins.

6. The method as claimed in claim 4, wherein a line is marked on a template, located between the leading ends of the pin and said tube, which correspond to a line joining the leading ends of the pins.

* * * * *